April 21, 1970     M. STEIDLE-SAILER     3,507,524
GLUED JOINT FOR TIMBER CONSTRUCTIONS Filed March 5, 1968     2 Sheets-Sheet 1

INVENTOR:
Manfred Steidle-Sailer

United States Patent Office 3,507,524
Patented Apr. 21, 1970

3,507,524
GLUED JOINT FOR TIMBER CONSTRUCTIONS
Manfred Steidle-Sailer, Sigmaringen, Germany, assignor to Hoscha G.m.b.H., Davos Platz, Graubunden, Switzerland, organized under the laws of Switzerland
Filed Mar. 5, 1968, Ser. No. 710,465
Claims priority, application Switzerland, Apr. 26, 1967,
5,946/67
Int. Cl. E04c 3/12, 3/30; B27f 1/02
U.S. Cl. 287—20.92                              5 Claims

ABSTRACT OF THE DISCLOSURE

An novel glued timber-construction joint formed between two intersecting diagonal members and a grooved chord is disclosed, the diagonal members lapping at one end where they are glued together to form at least one tenon which projects into a chord groove in which the tenon itself is glued. Each tenon constitutes a scarf and comprises two fingers with one finger being associated with each diagonal member. Each finger includes a beveled inside surface in contact with the beveled inside surface of the finger of the other diagonal member over a common surface area. The outside surface of each finger contacts a respective side wall of the chord groove. Each finger includes a chamfered end surface which terminates the beveled inside surface at the small end thereof. The fingers are slidably displaceable with respect to one another over their beveled inside surfaces so as to continuously vary the tenon thickness in the chord groove so as to ensure a tight joint without requiring high woodworking tolerances for the tenon and groove. A stop surface is disposed on each diagonal member and cooperates with the chamfered end surface of the finger of the other diagonal member so as to delimit the amount of the slidable displacement of the fingers and thus the maximum tenon thickness.

BACKGROUND OF THE INVENTION

The invention relates to a joint for timber constructions, wherein two neighboring diagonal members are glued together at a respective end where they lap and form at least one tenon that projects into a groove of the chord in which the tenon is glued.

Joints of this type are known in the prior art, and have the advantage that they incorporate relatively large gluing surfaces and therefore are able to support heavy loads.

Since these joints are always glued without applying a transverse pressure, they have the decisive disadvantage that the thickness of the tenon must correspond so closely to the groove width that the required precision is very difficult to get without taking special precautions during the wood-working.

Even the wedge-type finger joint of the prior art does not avoid this disadvantage, since the transverse pressures acting on each finger joint largely cancel each other out, and precise matching can be neglected only by using, for example, two-piece chords. Moreover, the required finger width leads to correspondingly thick chords or to a critical reduction in the area of the glued surfaces.

SUMMARY OF THE INVENTION

An object of the present invention is an improved joint of the kind described in the first paragraph of the preceding section, which joint, with respect to the area of the glued surfaces and its load capacity, is at least equal to that of the prior art, but which uses the customary wood-working tolerances for the width of the tenon and groove.

This object, as well as other objects of the invention will be apparent from the following detailed description.

BRIEF DESCRIPTION OF THE DRAWING

The invention will be described with reference to the figures of the accompanying drawings, wherein.

DESCRIPTION OF THE PREFERRED EMBODIMENTS

Figure 1:
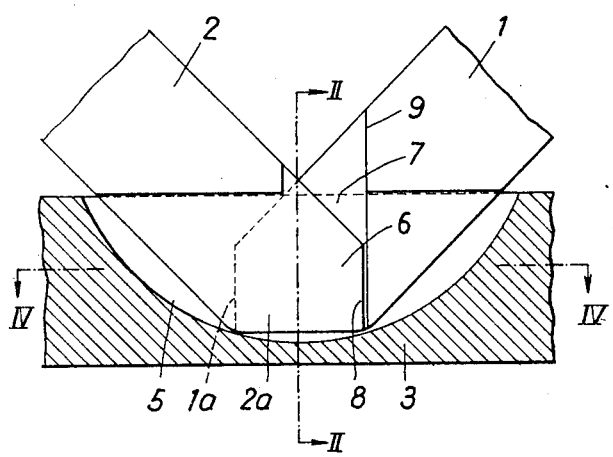
FIGURE 1 is a view in section taken along line I—I of FIGURE 4.
Figure 2:
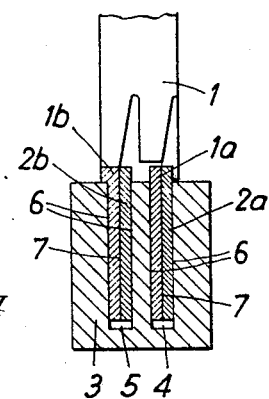
FIGURE 2 is a view in section taken along line II—II of FIGURE 1.
Figure 3:
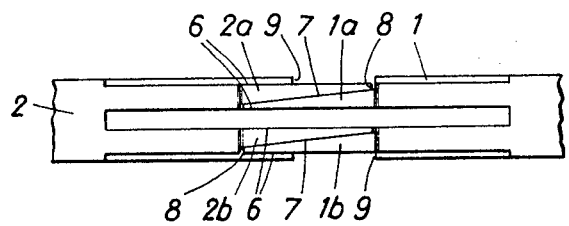
FIGURE 3 is a bottom view of respective ends of the diagonal members connected together, with the chord removed.
Figure 4:
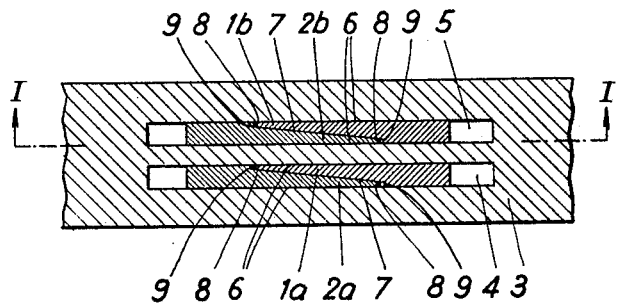
FIGURE 4 is a view in section taken along line IV—IV of FIGURE 1.
Figure 5:
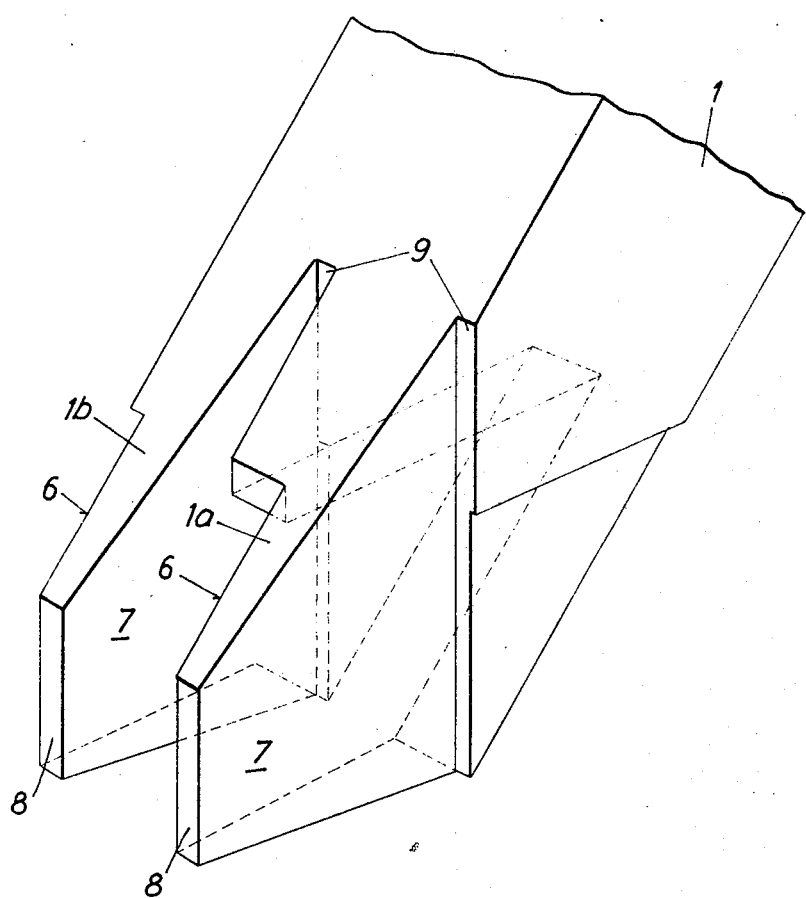
FIGURE 5 is a perspective view of an end of a diagonal member, with the width exaggerated.

With reference to the figures, the respective ends 1 and 2 of two diagonal members meet in the grooved chord 3. Each end incorporates two fingers 1a and 1b or 2a and 2b, which each embody a bevelled surface 7 that forms an angle of between approximately 5 and 15° with a respective side wall 6 of a finger, which side wall extends parallel to the planes of the diagonal-member side walls and therefore parallel to the side walls of the two chord grooves 4 and 5. Each bevelled surface is terminated by a flat surface 8 that defines a plane which is transverse to the lengthwise direction of the chord. The two grooves 4 and 5 are semicircular in shape, as seen in FIGURE 1, and receive the fingers. The two cooperating fingers of the respective diagonal members together each constitute a tenon, with the two surfaces 7 in contact. Each tenon forms a scarf. Each surface 7 is terminated at its rear by a surface 9 that acts as a stop which is so located that when the two surfaces 7 of a tenon cover each other there remains a certain gap between the end surface 8 of the one finger and the cooperating stop surface 9 on the other diagonal member.

To make the joint, a suitable glue first is spread over the groove walls and the walls 6 and surfaces 7, and the ends 1 and 2 of the two diagonal members then are slid together to form the two tenons, which latter are inserted into the respective grooves 4 and 5 of the chord. If now the grooves are too wide, as a consequence of the customary woodworking tolerances. So that the fingers are not pressed together, it suffices merely to slide the two ends closer together. The result is that, because the surfaces 7 are bevelled, the tenons are made thicker until the necessary transverse pressure is obtained. The amount to which the two ends can be slid over one another is limited by the stop surfaces 9, which prevent increasing the transverse pressure to the point where the chord would be split along the grain by wedge action.

The joint of the invention, in a simple manner, provides a large gluing surface, and simultaneously it avoids the need for an externally applied transverse pressure, to ensure a well glued joint, and the need for exactly made tenons and chord grooves.

In accordance with the invention, each end of a diagonal member can incorporate a single finger that incorporates a side wall 6 and bevelled surface 7. In this case, of course, the chord incorporates but a single groove.

What is claimed is:

1. A glued timber-construction joint formed between two intersecting diagonal members and a grooved chord, the diagonal members lapping at one end where they are glued together to form at least one tenon which projects into a chord groove in which said tenon itself is glued, each tenon constituting a scarf and comprising two fingers, one finger associated with each diagonal member, a bevelled inside surface incorporated by each said finger and in contact with the beveled inside surface of the finger of the other diagonal member over a common surface area, the outside surface of each said finger contacting a respective side wall of said chord groove, a respective chamfered end surface embodied by each said finger and which terminates each said beveled inside surface at the small end thereof, said fingers being slidably displaceable with respect to one another over their beveled inside surfaces to continuously vary the tenon thickness in said chord groove, and a stop surface disposed on each diagonal member and cooperating with the chamfered end surface of said finger of the other diagonal member to delimit the amount of said slidable displacement and thus the maximum tenon thickness.

2. The joint as defined in claim 1, wherein said end surface defines a plane that is perpendicular to the planes defined by the side walls of the respective diagonal member.

3. The joint as defined in claim 1, wherein the chord groove incorporates side walls that define planes which extend parallel to the side walls of the two diagonal members, each said finger including a side wall that is parallel to and contacts a respective said side wall of the chord groove, and said bevelled surface forms an acute angle with said groove side walls in a plane transverse thereto and parallel to the longitudinal direction of the chord, whereby two said fingers forming a tenon can be slid on one another over their said bevelled surfaces to vary continuously the tenon thickness.

4. The joint as defined in claim 3, wherein said chord-groove side walls, said finger side walls, and said bevelled surfaces constitute the gluing surfaces of the joint.

5. The joint as defined in claim 1, including two tenons and two chord grooves for receiving a respective tenon.

References Cited

UNITED STATES PATENTS 1,413,395   4/1922   Donnelly _____ 287—20.92

FOREIGN PATENTS 730,348   3/1966   Canada.
702,963   1/1954   Great Britain.
733,288   7/1955   Great Britain.
306,573   7/1955   Switzerland.
431,887   3/1967   Switzerland.

MARION PARSONS, Jr., Primary Examiner

U.S. Cl. X.R.

52—693; 144—309